US007457024B2

(12) United States Patent
Takeuchi et al.

(10) Patent No.: US 7,457,024 B2
(45) Date of Patent: Nov. 25, 2008

(54) IMAGE DISPLAY DEVICE

(75) Inventors: Takayuki Takeuchi, Kanagawa (JP); Yasuo Yamamoto, Minamiashigara (JP); Jun Kawahara, Minamiashigara (JP); Hiroaki Moriyama, Minamiashigara (JP); Rie Ishii, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 356 days.

(21) Appl. No.: 11/353,491

(22) Filed: Feb. 14, 2006

(65) Prior Publication Data

US 2006/0290595 A1 Dec. 28, 2006

(30) Foreign Application Priority Data

Jun. 22, 2005 (JP) ............................ 2005-182171

(51) Int. Cl.
*G02F 1/03* (2006.01)

(52) U.S. Cl. ........................ 359/241; 359/242; 347/232

(58) Field of Classification Search ................. 359/238, 359/241, 242; 347/232; 250/461
See application file for complete search history.

(56) References Cited

U.S. PATENT DOCUMENTS 7,199,348 B2 * 4/2007 Olsen et al. .............. 250/208.1
2006/0125911 A1 * 6/2006 Takahashi et al. ........... 347/232

FOREIGN PATENT DOCUMENTS

| | | |
|---|---|---|
| JP | 2003-131339 | 5/2003 |
| JP | 2003-170627 | 6/2003 |
| JP | 2004-018549 | 1/2004 |
| JP | 2004-198451 | 7/2004 |

* cited by examiner

*Primary Examiner*—Timothy J Thompson
(74) *Attorney, Agent, or Firm*—Fildes & Outland, P.C.

(57) ABSTRACT

The image display device of the present invention includes: a display layer that comprises a photochromic compound and whose regions, which have been irradiated with visible light, can be optically rewritten in a color corresponding to the color of visible light irradiated thereon; a light-emitting layer in which multiple luminescent elements are arranged in a matrix pattern, the elements irradiating visible light to each different region of the display layer by emitting light; and a drive unit provided with an obtaining unit that obtains image data. Based on image data obtained with the obtaining unit, the drive unit drives each luminescent element corresponding to each pixel of an image according to the image data to irradiate the visible light of a color corresponding to each pixel of the image of the image data.

11 Claims, 9 Drawing Sheets

IMAGE DISPLAY DEVICE

CROSS-REFERENCE TO RELATED APPLICATION

This application claims priority under 35 U.S.C. 119 from Japanese Patent Application No. 2005-182171, the disclosure of which is incorporated by reference herein.

BACKGROUND OF THE INVENTION

1. Field of the Invention

The present invention relates to an image display device that is provided with a reversibly rewritable display layer that has the capability to retain images.

2. Description of the Related Art

Due to increased paper consumption in offices, display technology media that can be used in place of paper have attracted attention. Such media include technologies such as electronic paper, which is reversibly rewritable/updatable and has the capability to retain images. This type of electronic paper must fulfill certain requirements, namely, it is necessary that the energy needed to rewrite with this type of electronic paper be small; that the paper be lightweight so as to be suitable for carrying around; and the paper must be highly reliable.

There have been many proposals for this type of electronic paper involving display methods utilizing photochromic compounds that allow for reversible rewriting by exposure to light. For examples of such paper, refer to Japanese Patent Application Laid-Open (JP-A) Nos. 2004-18549, 2004-198451, 2003-131339, and 2003-170627.

Multi-colored photochromic materials are disclosed in JP-A Nos. 2004-18549 and 2004-198451. These materials comprise titanium oxide that support silver particles. When visible light is irradiated on this titanium oxide, the material turns a color corresponding to the color of the visible light. With the technologies disclosed in JP-A Nos. 2004-18549, 2004-198451, an image display medium is provided where the photochromic material including titanium oxide is formed into a thin film formed on the surface of a glass substrate. When making the photochromic material formed into a thin film on the image display medium display color, it is necessary to irradiate visible light rays of a specified wavelength region on the photochromic material of the image display medium.

As shown in JP-A Nos. 2003-131339 and 2003-170627, the irradiation of visible and ultraviolet light on this type of photochromic material is performed with specialized image display devices. This type of image display device specifically includes components such as: a light source with a waveband that makes the photochromic material display colors; an ultraviolet lamp for irradiating ultraviolet light; rollers for conveying the image display medium to the positions where this light source and the ultraviolet lamp are arranged; and discharging rollers for discharging the image display medium irradiated with light from the light source and the ultraviolet lamp to the exterior of the device. Thus the displaying of an image on the image display medium is performed by irradiating visible or ultraviolet light on the photochromic material of the image display medium by an image display device that is provided separately from the image display medium.

With the above-described prior art, a specialized image display device is provided for forming an image on a display medium provided with a photochromic material. Since rewriting and erasure of an image displayed on the image display medium is performed, when writing an image in order to display the desired image on the image display medium, it is necessary to carry the medium to a position where the specialized image display device (i.e., writing device) is arranged. The execution of simple and easy rewriting of an image has thus proven difficult.

SUMMARY OF THE INVENTION

The present invention has been made in view of the above circumstances and provides image display device.

According to an aspect of the invention, an image display device includes:

a display layer that comprises a photochromic compound and whose regions, which have been irradiated with visible light, can be optically rewritten in a color corresponding to the color of visible light irradiated thereon;

a light-emitting layer in which plural luminescent elements are arranged in a matrix pattern, the elements irradiating visible light to each differing region of the display layer by emitting light; and a drive unit provided with an obtaining unit that obtains image data, the drive unit driving, on the basis of image data obtained by the obtaining unit, each luminescent element corresponding to each pixel of an image according to the image data, to irradiate the visible light of a color corresponding to each pixel of the image.

BRIEF DESCRIPTION OF THE DRAWINGS

An embodiment of the present invention will be described in detail based on the following figures, wherein.

DETAILED DESCRIPTION OF THE INVENTION

In an image display device according to the present invention, a display layer includes a photochromic compound that reversibly changes color with the irradiation of visible light, and displays color in accordance with the color of the visible light irradiated thereon. Titanium oxide that supports (holds) silver particles can be used as the photochromic compound. By using this photochromic compound, the display layer can be configured from one type of photochromic compound that displays light in accordance with visible light, without having to use multiple types of photochromic compounds having different maximum adsorption wavelengths when displaying color. Multiple luminescent elements are arranged in a matrix pattern in the light-emitting layer. These elements irradiate visible light to each differing region of the display layer. Organic electric field luminescent elements, inorganic electric field luminescent elements, and laser diodes can be employed as the luminescent elements. The drive unit is provided with an obtaining unit and when image data is obtained with the obtaining unit, each of the multiple luminescent elements of the light-emitting layer corresponding to each pixel of an image according to the image data are driven to irradiate visible light of a color corresponding to each pixel of the image.

In this manner, each luminescent element corresponding to each pixel is driven according to image data obtained with the obtaining means, and visible light of color corresponding to each pixel of this image data is irradiated from these elements to the display layer. Due to this, each region irradiated by the luminescent elements of the display layer turn the color to that of the visible light irradiated thereon.

Accordingly, the image according to the obtained image data can be easily displayed on the display layer formed by a photochromic compound, with a simple configuration, and without the need to provide a specialized writing device in order to rewrite an image displayed on the display layer. Further, an image corresponding to the obtained image data can be easily displayed, and therefore easily rewritten.

The embodiments of to the image display device according to the present invention will be explained based on the drawings.

Figure 1:
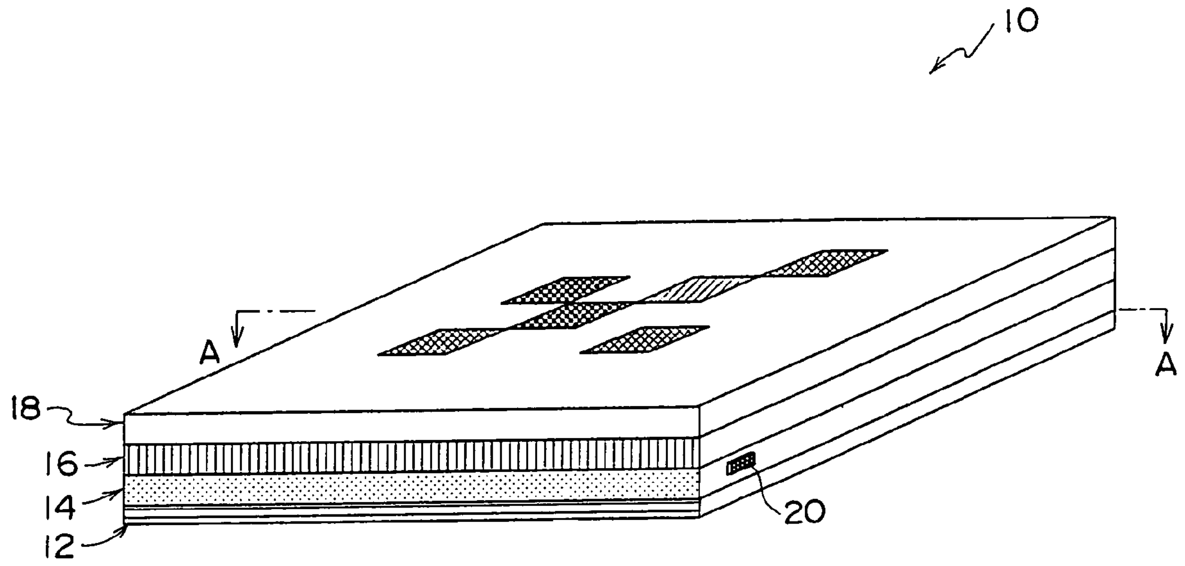
FIG. 1 is a perspective view showing the image display device according to the present invention.

As shown in FIG. 1, an image display device 10 includes a drive circuit 14, a light-emitting layer 16, and a display layer 18 layered in this order on a substrate 12.

A glass substrate or a flexible material can be used for the substrate 12, which acts as the support substrate in the present invention. Flexible materials such as polyester, polymethacrylate, and polycarbonate are preferable for this use. The thickness of the substrate 12 is not particularly limited as long as it is sufficient enough to maintain mechanical and thermal strength.

Qualities of the substrate 12 such as shape, configuration and size are also not particularly limited and can be appropriately selected in accordance with the use and purpose of the light-emitting layer 16. It is generally preferable that the substrate 12 be board/plate-shaped. The substrate 12 can be configured to have a single-layer structure or a layered (i.e., multi-layer) structure. Further, the substrate 12 can be configured from a single component or formed from two or more types of components.

The display layer 18 is configured to include a photochromic compound. Any compound that exhibits photochromic properties can be used for the photochromic compound, including thermally irreversible compounds such as diarylethene compounds, fulgide compounds, thermally reversible compounds such as spiropyran compounds, and spirooxazine compounds. Nonetheless, in the present invention, it is preferable to use a compound that exhibits thermally irreversible photochromic qualities.

The present embodiment will be explained in a case where titanium oxide that supports silver particles is used as the photochromic compound. The display layer 18 comprising titanium oxide that supports silver particles has a characteristic in that, when exposed to or irradiated with visible light, it develops color in the irradiated region corresponding to the color of the visible light. Specifically, when visible lights having different wavelengths are irradiated on the titanium oxide that supports silver particles, colors corresponding to the wavelength of the irradiated light are produced. For this reason, an image of desired color can be displayed on the display layer 18 by irradiating visible light having color corresponding to the image to be displayed, on the region of the display layer 18, corresponding to the pixels of the image.

Figure 2:
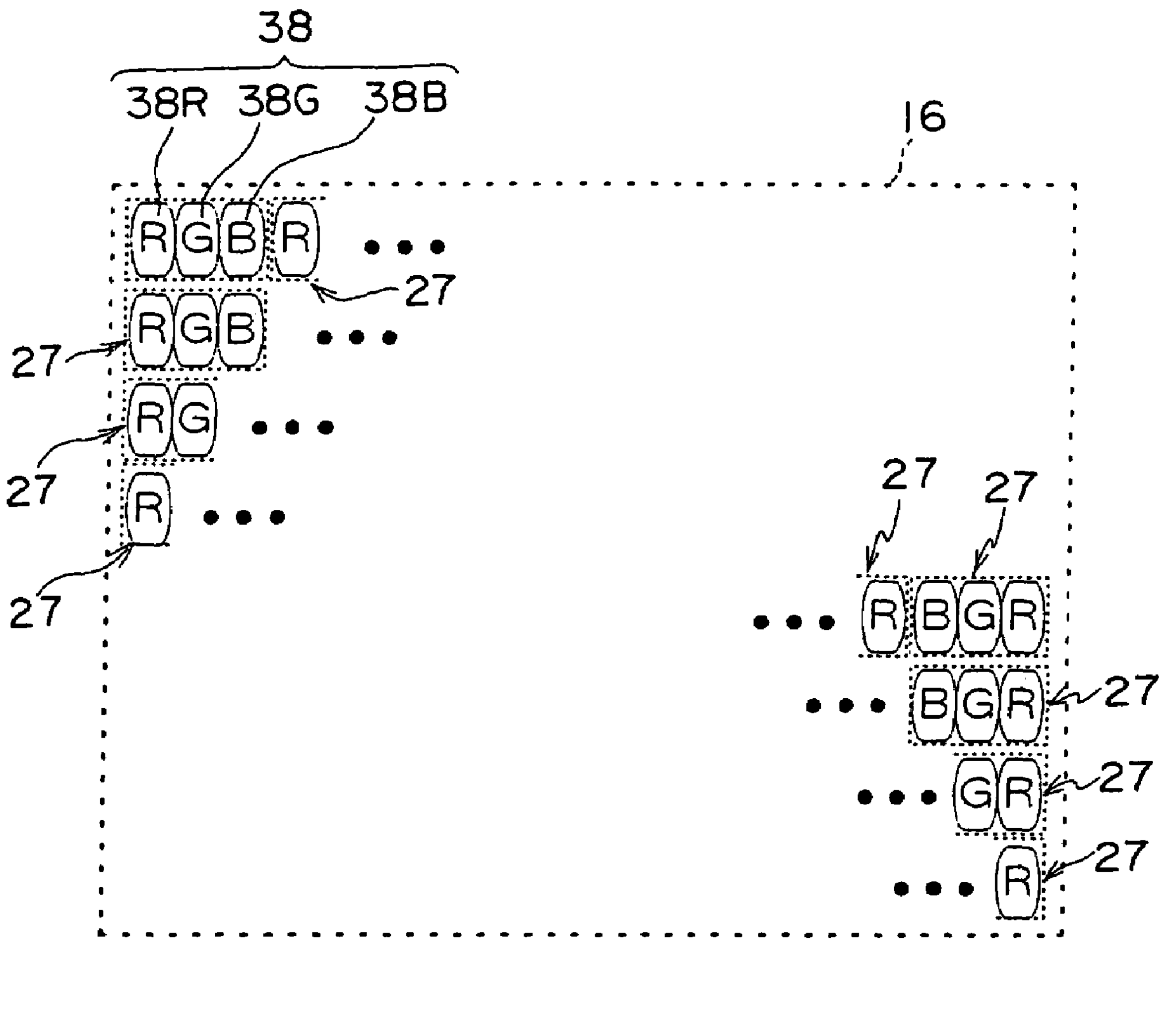
FIG. 2 is a plan view showing a light-emitting layer.

As shown in FIG. 2, the light-emitting layer 16 is configured such that luminescent-type luminescent elements (to be described in detail below) for irradiation of visible light are arranged in a matrix pattern. The light-emitting layer 16 is configured to include luminescent elements 38R, 38G and 38B that each emit light of a color red (R), green (G), and blue (B) within each pixel region 27 on the light-emitting layer 16 of the display layer 18. Each pixel region 27 is provided corresponding to each pixel region of an image to be displayed on the display layer 18. In this way, when an image is displayed on the display layer 18, visible light of colors corresponding to each pixel of the image can be irradiated to each pixel region on the display layer 18. It should be noted that when generally referring to each of the luminescent elements, these are referred to as the luminescent elements 38. Each luminescent element 38 emits light due to the selective application of voltage from the drive circuit 14. Visible light irradiated from each pixel region 27 due to the emitted light of each of the luminescent elements 3 8 is irradiated on the corresponding pixel regions of the display layer 18. When the visible light is irradiated, the region on the display layer 18 where the visible light was irradiated develops color corresponding to the irradiated light.

Examples of the luminescent elements 38 include organic electroluminescent (EL) elements, inorganic EL elements, and light-emitting diodes (LED).

The drive circuit 14 is provided with a data input unit 20 for inputting image data from an external device (not shown) such as a personal computer (hereafter, PC). The luminescent elements 38 are drive controlled such that voltage is applied to each luminescent element 38 in the pixel region 27 of the light-emitting layer 16 based on the image data inputted via the data input unit 20, whereby visible light of colors corresponding to each pixel of the image of the inputted image data is irradiated from luminescent elements 38 inside each pixel region 27 to the display layer 18.

It should be noted that the data input unit 20 includes an input terminal (not shown) for connecting so as to be able to receive data from an external device such as a PC that can generate image data and output the generated image data to the image display device 10. The device is configured such that image data can be inputted via this input terminal from an external device. Specifically, the device is configured with a USB terminal or the like functioning as the input terminal. The device can also be provided with a communication unit functioning as the data input unit 20 for receiving data from an external device such as a PC in a state of no contact. When the device is thus configured, image data can be inputted from an external device with which the present device in non-contact manner.

The drive circuit 14 corresponds to the drive unit of the present invention and the data input unit 20 corresponds to the obtaining unit of the present invention.

Figure 3:
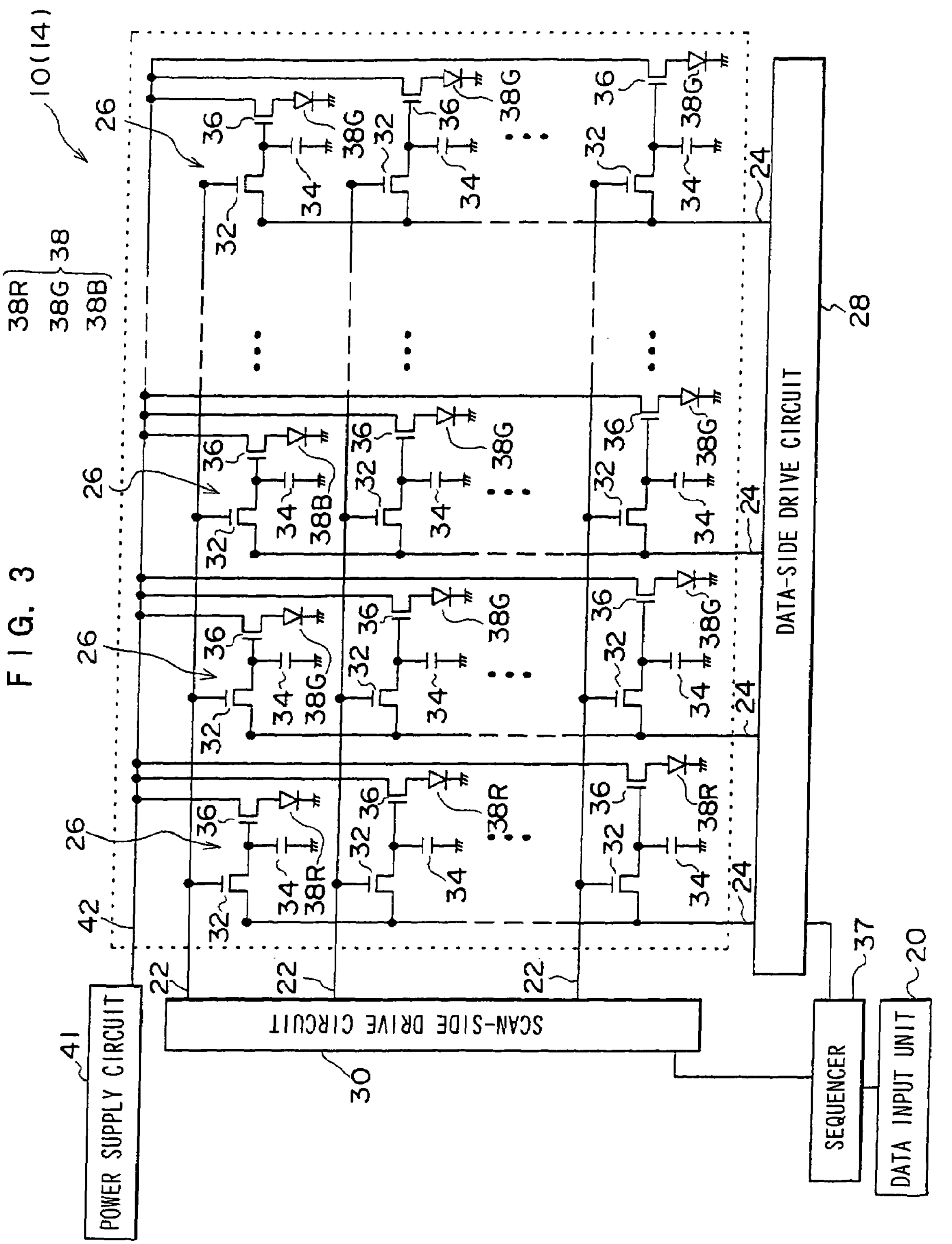
FIG. 3 is a block diagram showing the electrical configuration of the image display device according to the present invention.

A block drawing of an example of an electrical configuration of the image display device 10 according to the present embodiment is shown in FIG. 3. Here, it should be noted that the electrical configuration of the image display device 10 is not limited to the configuration shown in the drawings.

The image display device 10 shown in FIG. 3 is an active matrix system utilizing a thin film transistor for the switching element.

Multiple scanning wires 22 and multiple signal wires 24, which arranged to traverse each other relative to the scanning wires 22, are provided at the drive circuit 14 of the image display device 10. Micro-pixel drive regions 26 for driving each of the luminescent elements 38 are provided at each cross point vicinity of the scanning wires 22 and signal wires 24. That is, the micro-pixel drive regions 26 are provided, for each pixel region 27 of the light-emitting layer 16 in the drive circuit 14 in order to drive the luminescent elements 38R that emit red-colored visible light, the luminescent elements 38G that emit green-colored visible light, and the luminescent elements 38B that emit blue-colored visible light inside each pixel region 27. Namely, the micro-pixel drive regions 26 are arranged in a matrix pattern.

The drive circuit 14 is provided with a number of micro-pixel drive regions 26 that can display color at each pixel such that each pixel can show each of the colors of R, G, and B at the pixels that are necessary for displaying an image on the display layer 18.

A data-side drive circuit 28 provided with a shift resistor, a level shifter, a video line, and an analog switch is connected to the signal wires 24 so as to be able to receive signals. A scan-side drive circuit 30 provided with the shift resistor and the level shifter is connected to each scanning wire 22. Also, a power supply circuit 41 for supplying electric power to each micro-pixel drive region 26 is provided at the drive circuit 14.

Each of the micro-pixel drive regions 26 are configured to include a switching thin film transistor (SW-TFT) 32, a condenser (capacitor) 34, a current thin film transistor (Dr-TFT) 36, and a luminescent element 38.

It should be noted that the transistors used in the image display device 10 of the present invention can be formed by any one of a low-temperature polysilicon, amorphous silicon, or organic material.

The scanning wires 22 are connected to the gate terminals of the SW-TFT 32. The SW-TFT 32 are driven to an ON-state or an OFF-state in response to scanning signals supplied from the scari-side drive circuit 30 via the scanning wires 22. The condensers 34 store electric power in accordance with image signals supplied from the signal wires 24 via the SW-TFT 32 (i.e., the condenser 34 goes into a state of charging).

The power supply circuit 41 is grounded with the wiring 42 via the Dr-TFT 36 and the luminescent elements 38. The gate terminals of the Dr-TFT 36 are connected to the SW-TFT 32 and the condensers 34. When the electric power according to the image signals stored in the condensers 34 is supplied to the gate terminals of the Dr-TFT 36, the Dr-TFT 36 are driven to the ON-state, and the luminescent elements 38 are electrically connected to the power supply circuit 41 via the Dr-TFT 36. When the luminescent elements 38 are electrically connected to the power supply circuit 41, drive electric current is supplied from the power supply circuit 41 to the luminescent elements 38. In the case where the device is configured such that luminescent elements 38 are organic EL, an organic material such as a diamine-type material or the like is retained between electrodes (not shown) so as to act as the light-emitting layer. The light-emitting layer 16 emits light due to the supplying of drive current.

The image display device 10 is further provided with a sequencer 37. The sequencer 37 is connected to each of the scan-side drive circuit 30, the data-side drive circuit 28, and the data input unit 20 so as to be able to receive data and commands. When image data is inputted from an external device such as a PC via the data input unit 20, the sequencer 37 controls each of the scan-side drive circuit 30 and the data-side drive circuit 28 so that image signal and scanning signal are supplied to each micro-pixel drive region 26 in accordance with the inputted image data.

When the scanning signals are supplied from the scanning wires 22 by the scan-side drive circuit 30 and the data-side drive circuit 28, and the SW-TFT 32 are driven to the ON-state, electric power corresponding to the image signals supplied from the signal wires 24 is accumulated in the condenser 34. The ON or OFF states of the Dr-TFT 36 are determined in accordance with the electric power stored in the condenser 34. When the Dr-TFT 36 are driven to the ON-state and drive electric current is supplied to the luminescent elements 38 from the power supply circuit 41 via the Dr-TFT 36, an amount of light emission according to the amount of electric current by the drive current can be obtained from the luminescent elements 38.

The drive circuit 14 applies voltage in this manner, as shown in FIG. 3, to each of the luminescent elements 38 inside each of the pixel regions 27 (see FIG. 2) of the light-emitting layer 16, based on image data inputted via the data input unit 20. Due to this, the luminescent elements 38 can be drive-controlled so that visible light of colors corresponding to each pixel of the image of the inputted image data is irradiated on the display layer 18 from the luminescent elements 38 inside each pixel region 27.

It should be noted that the configuration of the image display device 10 shown in FIG. 3, with the exception of the luminescent elements 38, corresponds to the drive circuit 14 and the luminescent elements 38 correspond to the light-emitting layer 16.

Next, the manufacturing method for the image display device 10 will be explained. The portions of the A-A lines of the image display device 10 shown in FIG. 1 are shown as cross-sectional drawings in FIGS. 4A to 4D.

Figure 4A:
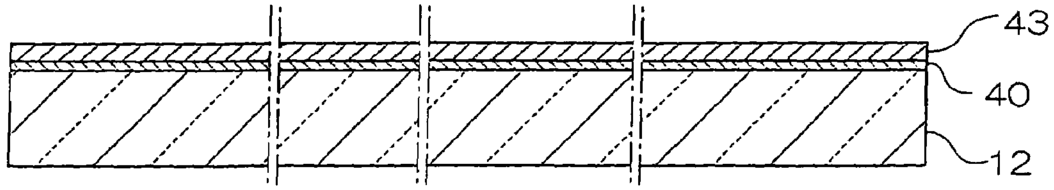
FIGS. 4A to 4D are process drawings explaining the manufacturing method for the image display device according to the present invention.
Figure 4B:
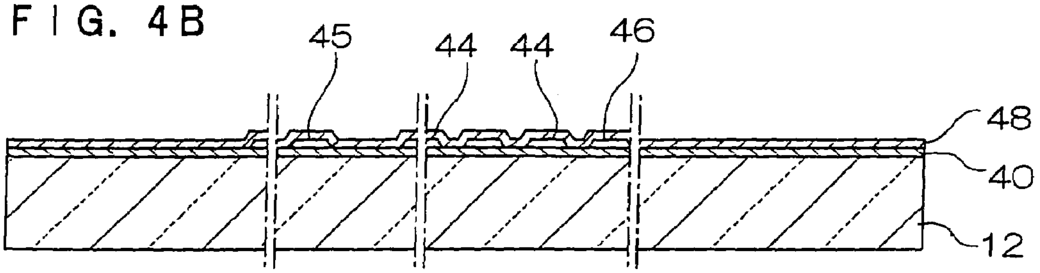

As shown in FIG. 4A, with the image display device 10 of the present invention, a base protective layer 40 formed by silicon oxidized film and the like is formed on the substrate 12. Next, after an amorphous silicon layer is formed using a method such as a plasma CVD method or the like, crystal grains are made to grow by a laser annealing method or a rapid heating method, thereby creating a polysilicon layer 43. Then, the polysilicon layer 43 is patterned by a photolithographic method, island-shaped silicon layers 44, 45, and 46 are formed as shown in FIG. 4B, and a gate insulating layer 48 made from a silicon oxide film is further formed.

The silicon layer 44 is a layer which structures the Dr-TFT 36 connected to the luminescent elements 38 formed at positions corresponding to the micro-pixel drive regions 26. The silicon layers 45 and 46 are layers that respectively structure the P channel thin film transistor and N channel thin film transistor in the scan-side drive circuit 30.

Formation of the gate insulating layer 48 is performed using a method such as a plasma CVD method, a thermal oxidation method or the like, and is performed by forming a silicon oxide film having a thickness of approximately 30 nm to 200 nm that covers each of the silicon layers 44, 45, and 46, and the base protective layer 40. Here, when forming the gate insulating layer 48 using a thermal oxidation method, crystallization of the silicon layers 44, 45, and 46 is also performed so that these silicon layers can be turned into polysilicon layers.

Figure 4C:
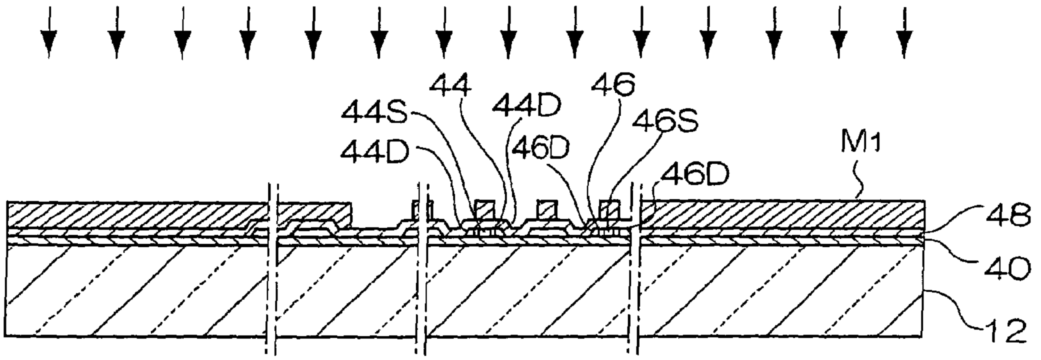

Next, as shown in FIG. 4C, an ion-implantation selective mask M1 is formed on portions of the silicon layers 44 and 46 and in this state, phosphorus ions are implanted at a dose amount of approximately $1\times10^{15}cm^{-2}$. As a result, a highly concentrated impure material is introduced in a self-aligning manner with respect to the ion-implantation selective mask M1, and high-density source regions 44S, 46S and high-density drain regions 44D, 46D are formed in the silicon layers 44 and 46.

Figure 4D:
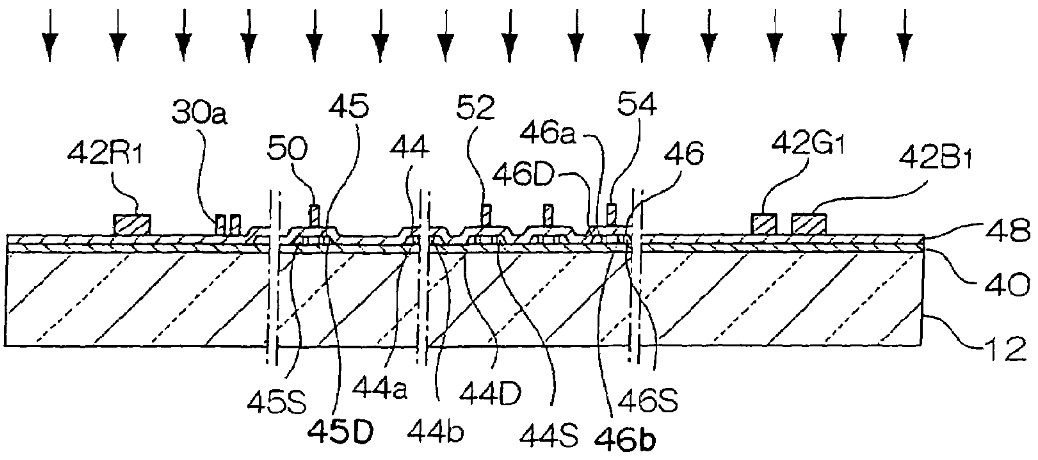

Then, as shown in FIG. 4D, after removing the ion-implantation selective mask M1, a metal film (i.e., doped silicon layer, silicide layer, aluminum layer, chrome layer, tantalum layer, or the like) having a degree of thickness of approximately 200 nm is formed on the gate insulating layer 48. Further, by patterning this metal film, a gate electrode 50 of a P channel TFT, a gate electrode 52 of the Dr-TFT 36, and a gate electrode 54 of the N channel TFT, of the scan-side drive circuit 30, are formed. Further, with the above-described patterning, wiring 30*a* for the scan-side drive circuit 30 and first wiring 42 (i.e., wiring 42R for the luminescent elements 38R, wiring 42G for the luminescent elements 38G and wiring 42B for the luminescent elements 38B) for the light-emitting power source is simultaneously formed. Furthermore, when forming these components such as the gate electrodes 50, 52, and 54, the scanning wires 22 (omitted from the drawings in FIGS. 4A to 4D) are also simultaneously formed. It should be noted that in the present invention, the wiring 42 is also formed at this time.

Moreover, the gate electrodes 50, 52, and 54 are made into masks, and phosphorus ions are implanted at a doping amount of approximately $4\times10^{42}cm^{-2}$ with respect to the silicon layers 44, 45, and 46. As a result, an impure material is introduced in a self-aligning manner at low concentration relative to the gate electrodes 50, 52, and 54 and, as shown in FIG. 4D, low-density source regions 44*b*, 46*b* and low-density drain regions 44*a*, 46*a* are formed in the silicon layers 44 and 46. Further, low-density impurity regions 45S, 45D are formed in the silicon layer 45.

Figure 5A:
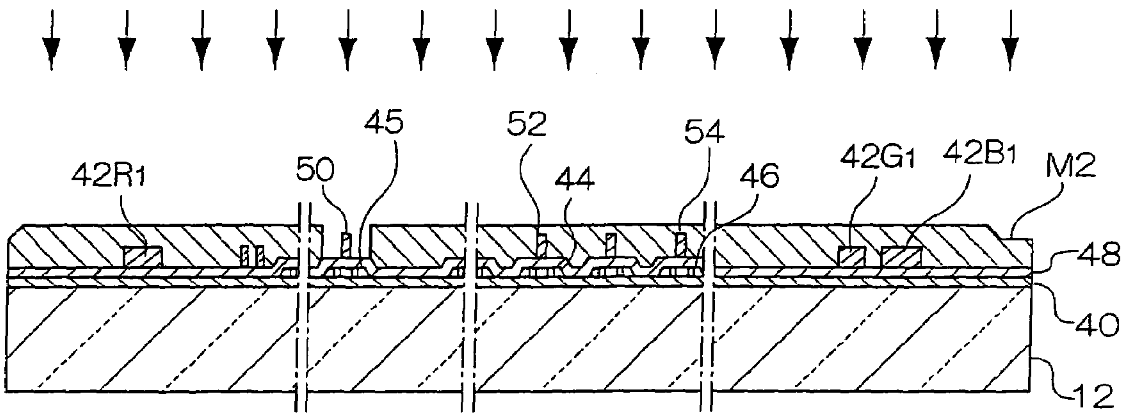
FIGS. 5A to 5C are process drawings explaining the manufacturing method for the image display device according to the present invention.

Next, as shown in FIG. 5A, an ion-implantation selective mask M2 is formed on the entire surface except for the periphery of the gate electrode 50. Using this ion-implantation selective mask M2, boron ions are ion-implantation at a doping amount of approximately $1.5\times10^{15}cm^{-2}$ with respect to the silicon layer 45. As a result, the gate electrode 50 also functions as a mask and highly concentrated impure material is doped in the silicon layer in a self-aligning manner. Due to this, the 45S and 45D are counter-doped, and these become a source region and a drain region of the P channel TFT in the scan-side drive circuit 30.

Figure 5B:
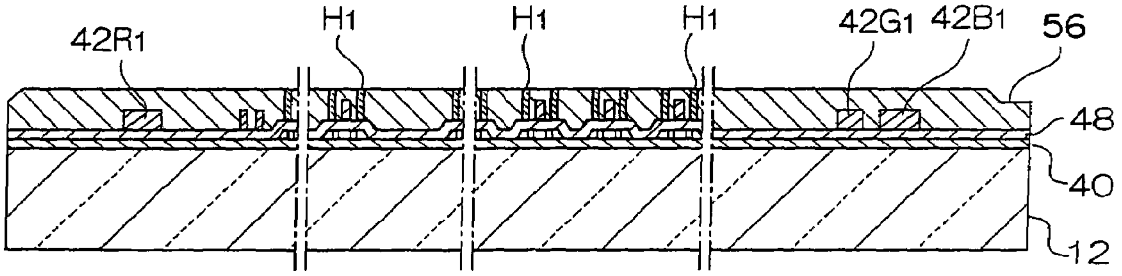
Figure 5C:
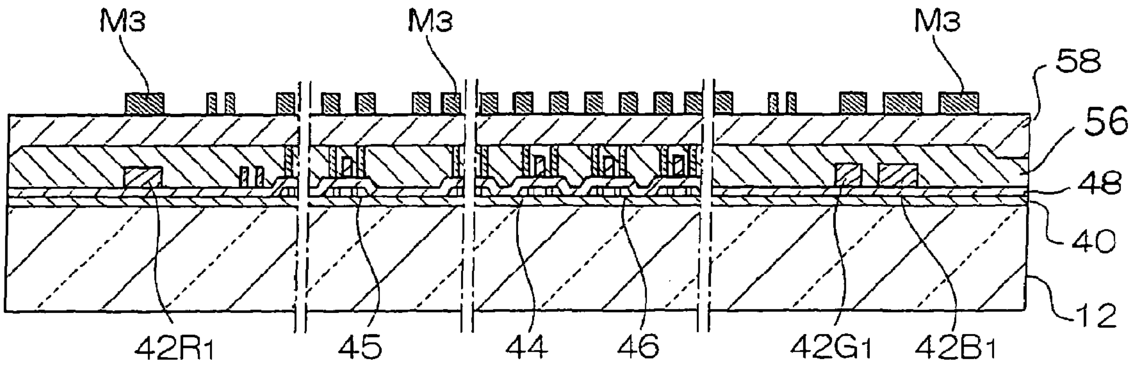

Then, as shown in FIG. 5B, a second interlayer insulating layer 56 is formed on the entire surface of the substrate 12 after removing the ion-implantation selective mask M2. Further, the second interlayer insulating layer 56 is patterned with a photolithographic method and holes H1 for contact hole formation are provided at positions corresponding to the source electrodes and drain electrodes of each TFT. Next, as shown in FIG. 5C, a conductive layer 58 with a thickness of approximately 200 nm to 800 nm is formed from a metal such as aluminum, chrome, tantalum and the like so as to cover the second interlayer insulating layer 56. The holes H1 formed earlier are filled in with these metals and the contact holes are formed. A patterning mask M3 is further formed on the conductive layer 58.

Figure 6A:
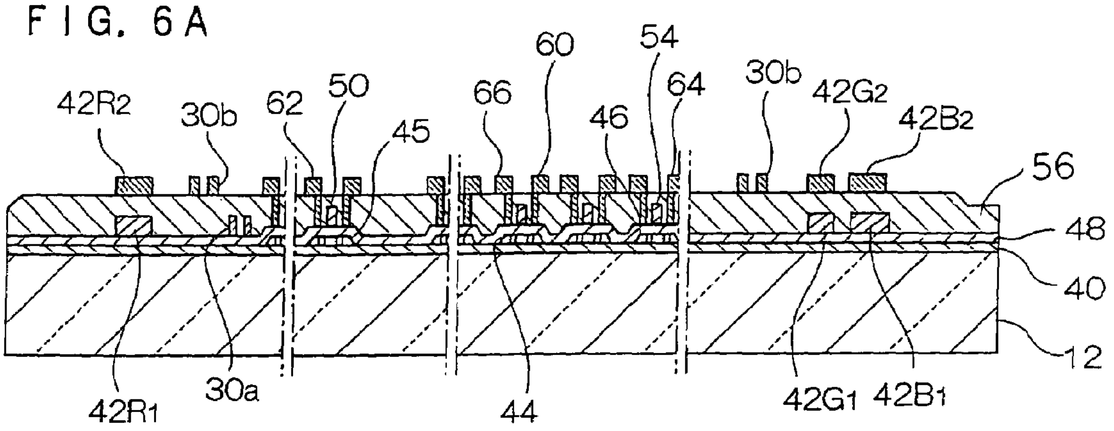
FIGS. 6A to 6C are process drawings explaining the manufacturing method for the image display device according to the present invention.

Next, as shown in FIG. 6A, the conductive layer 58 is patterned with the patterning mask M3, and source electrodes 60, 62, and 64 for each TFT; drain electrodes 66; second wiring 42$R_2$, 42$G_2$, and 42$B_2$ for each light-emitting power source wiring; and a power source wiring 30*b* for the scan-side drive circuit 30 are formed.

In the present invention, power source wirings (for R, G, and B) are also formed at this step.

Figure 6B:
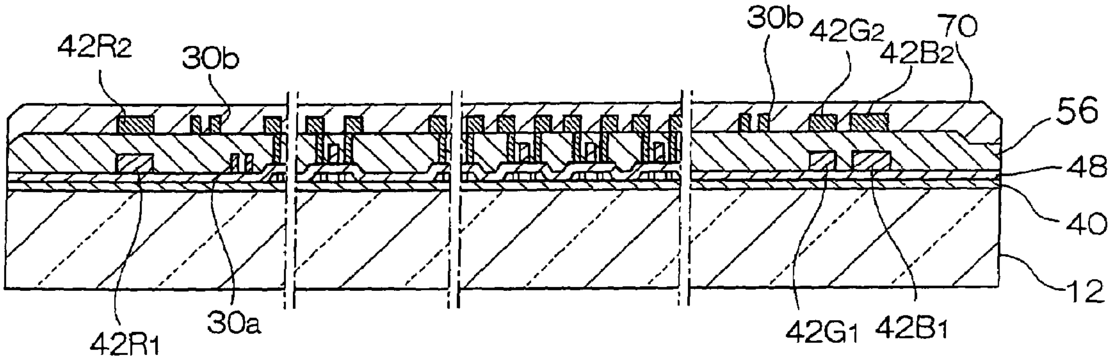
Figure 6C:
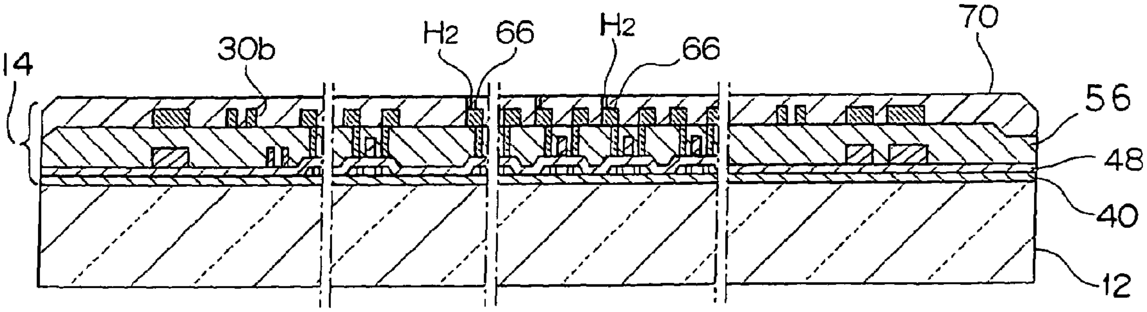

When the above-described steps have been completed, a first interlayer insulating layer 70 that covers the second interlayer insulating layer 56 is formed from, e.g., an acrylic-type resin material, as shown in FIG. 6B. It is preferable that the first interlayer insulating layer 70 is formed to have a thickness of approximately 1 to 2 μm. Next, as shown in FIG. 6C, portions of the first interlayer insulating layer 70 corresponding to the drain electrode 66 of the Dr-TFT 36 are removed with etching and holes H2 for the formation of contact holes are formed. In this manner, the drive circuit 14 is formed on the substrate 12.

Figure 7A:
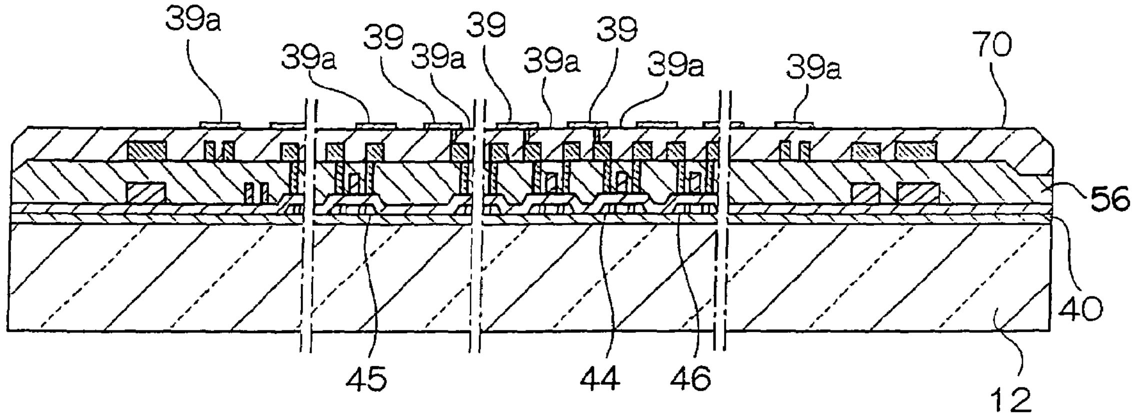
FIGS. 7A to 7C are process drawings explaining the manufacturing method for the image display device according to the present invention.

Next, the process for forming the light-emitting layer 16 on the drive circuit 14 will be explained while referring to FIGS. 7A to 7C. First, as shown in FIG. 7A, a thin film made from a transparent electrode material such as ITO (Indium Tin Oxide) is formed so as to cover the entire surface of the substrate 12. By patterning this thin film, metal is filled in the holes H2 provided on the first interlayer insulating layer 70, and contact holes are formed while electrodes 39 and dummy electrodes 39*a* of the luminescent elements 38 are formed. The pixel electrodes 39 are only formed at the portions where the Dr-TFT 36 are formed, and are connected to the Dr-TFT 36 via these contact holes. The dummy electrodes 39*a* are provided in an island pattern.

Figure 7B:
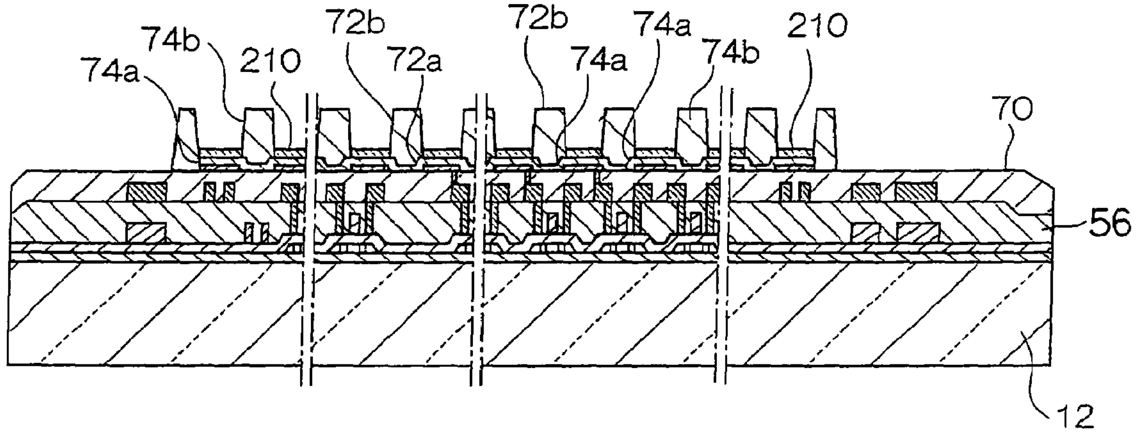

Next, as shown in FIG. 7B, an inorganic bank layer 72*a* and dummy inorganic bank layer 74*a* are formed on the first interlayer insulating layer 70, the pixel electrodes 39, and the dummy electrodes 39*a*. The inorganic bank layer 72*a* is formed so that portions of the pixel electrodes 39 are exposed, and the dummy inorganic bank layer 74*a* is formed so as to completely cover the dummy electrodes 39*a*. An inorganic film of $SiO_2$, $TiO_2$, SiN and the like is formed on the entire surface of the first interlayer insulating layer 70 and a pixel electrode 39 using a method such as a plasma CVD method, TEOS CVD method, sputtering method, or the like, after which the inorganic bank layer 72*a* and dummy inorganic bank layer 74*a* are formed by patterning the inorganic film. Further, as shown in FIG. 7B, an organic bank layer 72*b* and a dummy organic bank layer 74*b* are formed on the inorganic bank layer 72*a* and the dummy inorganic bank layer 74*a*. The organic bank layer 72*b* is formed such that portions of the pixel electrodes 39 are exposed from the inorganic bank layer 72*a*, and the dummy organic bank layer 74*b* is formed such that a portion of the dummy inorganic bank layer 74*a* is exposed. Thus, the bank portion 72 is formed on the first interlayer insulating layer 70.

Next, a region that exhibits hydrophilic properties and a region that exhibits hydrophobic properties are formed on the surface of the bank portion 72. In the present embodiment, these regions are formed with a plasma treatment step. Specifically, the plasma treatment step has at least a lyophilicizing (hydrophilicizing) step that make the pixel electrodes 39, the inorganic bank layer 72*a*, and the dummy inorganic bank layer 74*a* hydrophilic, and a liquid repellant step whereby the organic bank layer 72*b* and the dummy organic bank layer 74*b* are made to have hydrophobic properties.

More specifically, the bank portion 72 is heated to a predetermined temperature (e.g., 70 to 80° C.) and then plasma treatment ($O_2$ plasma treatment) which uses the oxygen in the air as a reactive gas is performed as the lyophilicizing (hydrophilicizing) step. Next, plasma treatment (CF4 plasma treatment) which uses the fluromethane in the air as a reactive gas is performed as the liquid-repelling step, and by cooling the bank portion 72 that was heated for plasma treatment back to room temperature, the hydrophilic and water-repelling (hydrophobic) properties are imparted at certain areas.

Further, the light-emitting layer 16 and a dummy light-emitting layer 210 are respectively formed on the pixel electrodes 39 and the dummy inorganic bank layer 74*a* using an inkjet process. The light-emitting layer 16 and dummy light-emitting layer 210 are formed by discharging and drying an ink composition including an electron hole-injection/transport layer material, after which an ink composition comprising material for the light-emitting layer is discharged and dried. It should be noted that after the formation step for this light-emitting layer 16 and dummy light-emitting layer 210, oxidation of the electron hole-injection/transport layer and the light-emitting layer should be prevented, so it is preferable that subsequent steps are performed in an atmosphere of inert gas such as a nitrogen atmosphere, an argon atmosphere or the like.

Figure 7C:
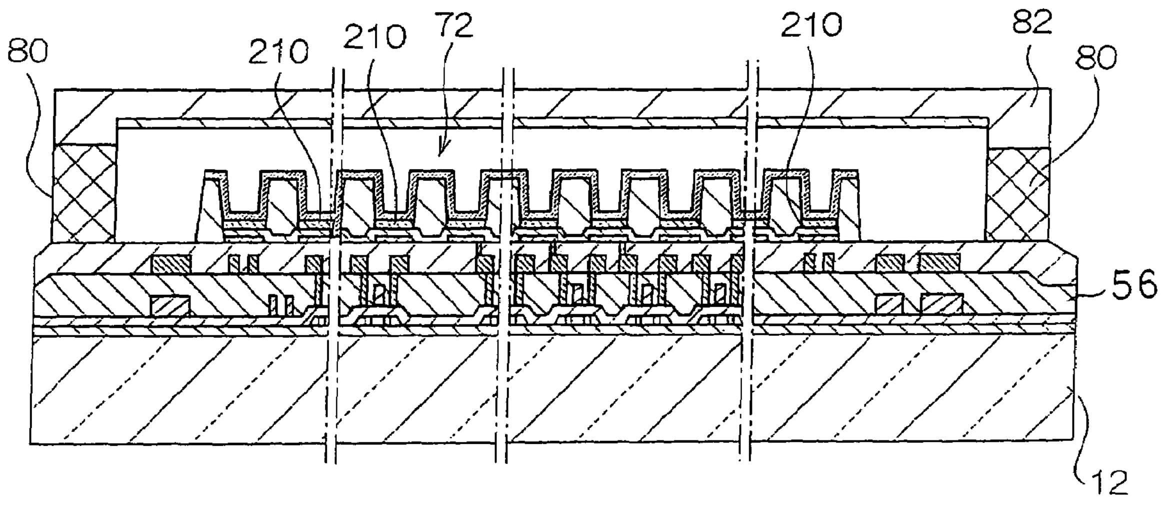

Next, as shown in FIG. 7C, a sealant 80 made from a material such as an epoxy resin is coated on the substrate 12 and a sealing substrate 82 is joined to the substrate 12 via this sealant 80.

Further, although this has been omitted from the drawings, the image display device 10 can be manufactured by further layering the display layer 18 on this sealing substrate 82.

An example of the layering method for the display layer 18 includes forming a thin film of titanium oxide by coating STS21 titanium oxide powder (produced by Ishihara Sangyo Kaisha, LTD.) using a spin-coating method on the sealant substrate 82, and then soaking it for several minutes in a silver nitrate water solution in a state where all light has been blocked, so as to make silver ions adsorb to the titanium oxide powder surface. After that, the substrate 82 is taken out from the silver nitrate water solution, excess nitric acid solution is washed off by pure water, and then dried. After that, ultraviolet light (at approximately 1 $mW/cm^2$) is irradiated on the thin film of titanium oxide on which the silver ions have been adsorbed to the surface thereof, for 10 minutes out in the air. As a result, silver particles are deposited on the surface of the titanium oxide powder, and thus a photochromic material formed by titanium oxide that supporting silver particles can be layered on the sealing substrate 82.

It should be noted that it is preferable to use a porous device provided with many small holes for the application of the titanium oxide powder.

Next, the processing executed with the image display device 10 of the present invention will be described.

Figure 8:
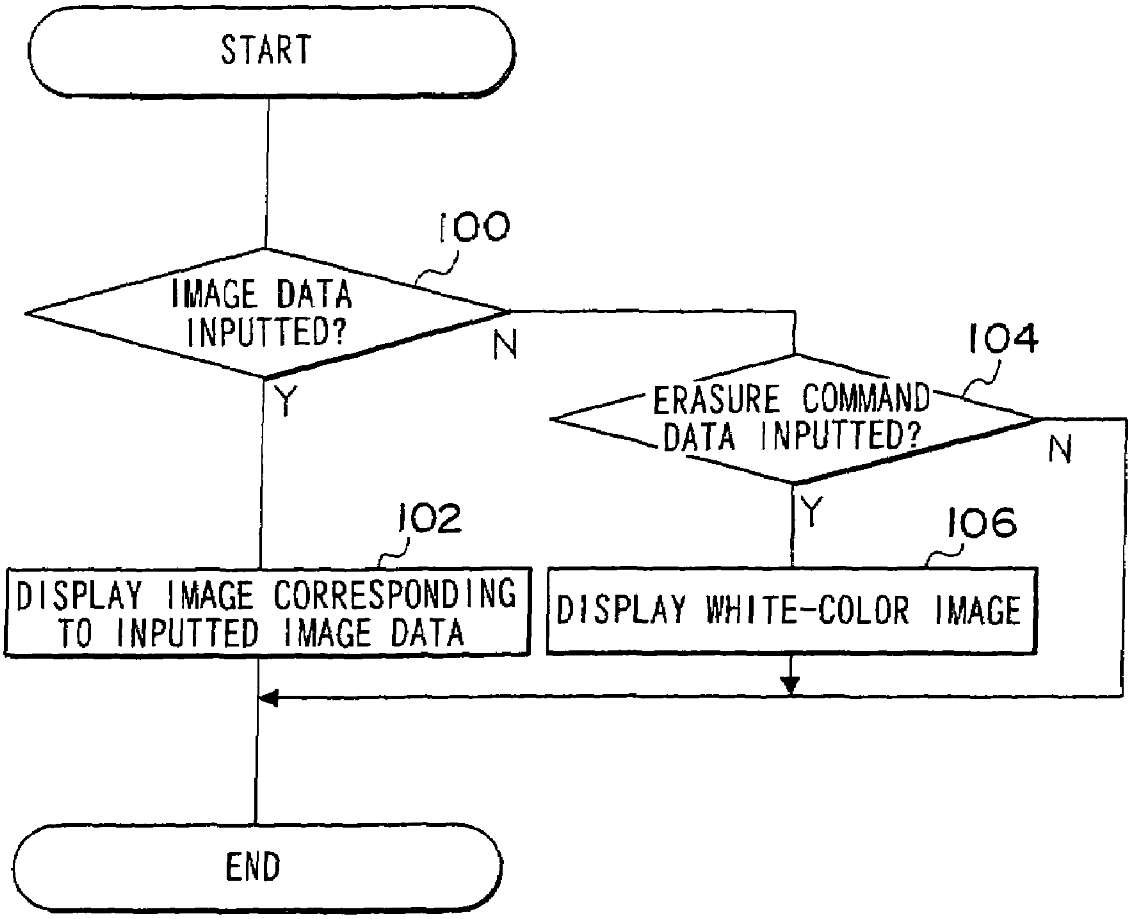
FIG. 8 is a flowchart showing the processing executed by the image display device according to the present invention.

The process routine shown in FIG. 8 is executed with the sequencer 37 of the image display device 10. In step 100, it is determined whether image data has been inputted from an external device via the data input unit 20. When the determination is affirmative, the routine proceeds to step 102 and the data-side drive circuit 28 and scan-side drive circuit 30 are controlled to display an image according to the image data inputted at step 100, i.e., to make the luminescent elements 38, which the position and the color correspond to each pixel of the image to be displayed, emit light. After making the luminescent elements 38, in the micro-pixel drive region 26, having colors corresponding to each pixel of the image emit light, the present routine is terminated.

Due to the processing in step 102, an image according to the inputted image data is displayed on the display layer 18, or image displayed on the display layer 18 is rewritten to the image according to the inputted image data.

On the other hand, if a negative determination is made at step 100, the routine proceeds to step 104, and it is determined whether an erasure instruction for erasing the image displayed on the display layer 18 has been inputted via the data input unit 20. When the determination is affirmative, the routine proceeds to step 106 and when the determination is negative, the routine is terminated as no data has been inputted from the data input unit 20.

At step 106, the data-side drive circuit 28 and the scan-side drive circuit 30 are controlled so as to display a white image on the entire surface of the display layer 18, and then the present routine is terminated.

Due to the process of step 106, the image displayed on the display layer 18 can be erased with a simple configuration by displaying a white-color image on the entire surface of the display layer 18.

As described above, the image display device 10 of the present invention includes the drive circuit 14 that drives each luminescent element 38 of the light-emitting layer 16 which corresponds to each pixel of an image to be displayed; the light-emitting layer 16 provided with multiple luminescent elements 38 for irradiating visible light on the display layer 18; and the display layer 18 formed from a photochromic compound, layered on the substrate 12 in this order. Voltage is applied to each luminescent element 38 in each pixel region 27 of the light-emitting layer 16 in accordance with image data inputted from the data input unit 20, whereby the color of visible light corresponding to each pixel of an image of the image data is irradiated on the display layer 18 from the luminescent elements 38 inside each pixel region 27, and the display layer 18 produces color in accordance with the color of the visible light irradiated on the display layer 18, whereby an the image is displayed in accordance with the image data.

Accordingly, an image display device which an image displayed on the displaying surface can be rewritten in a simple configuration can be provided.

Further, when a command for erasing the image displayed on the display layer 18 is inputted, the drive circuit 14 selectively drives each of the luminescent elements 38 of the light-emitting layer 16 to color the entire surface of the display layer 18 white, so an image displayed on the display layer 18 can be easily erased.

Also, with the present invention, titanium oxide that supports silver particles is employed as the photochromic material forming the display layer 18. For this reason, there is no need to mix using multiple types of photochromic materials with differing adsorption wavelengths to form the display layer 18. Further, the display layer 18 formed by the photochromic material can be easily layered.

With the present invention, there is no need to provide special devices for writing, rewriting, and erasing image data with respect to the image display device 10. An image according to image data generated or maintained at a normally used external device such as a PC can be displayed on the display layer 18 while these devices can connect and receive data via the data input unit 20.

Furthermore, after the writing, rewriting, and erasure of image data, the image display device 10 that can be easily and simply carried around by releasing the connection between the data input unit 20 of the image display device 10 and the external device.

The above descriptions are made with regard to a drive system of the image display device according to the present invention using is an active matrix system. However the drive system can be designed to employ a simple matrix.

It should be noted that in the present embodiment, a case where, in order to display the image of image data in full color, the light-emitting layer 16 is configured to include luminescent elements 38R, 38Q and 38B that each emit light of the colors red (R), green (G), and blue (B) in each of the pixel regions 27, which corresponds to each pixel region of the image to be displayed on the display layer 18. However, the method for displaying a color image on the display layer 18 is not limited to this method.

For example, for the luminescent elements 38, luminescent elements that emit only white-colored light can be arranged in a matrix pattern in the light-emitting layer 16, and a color-filter layer can be provided between the light-emitting layer 16 and the display layer 18.

Figure 9:
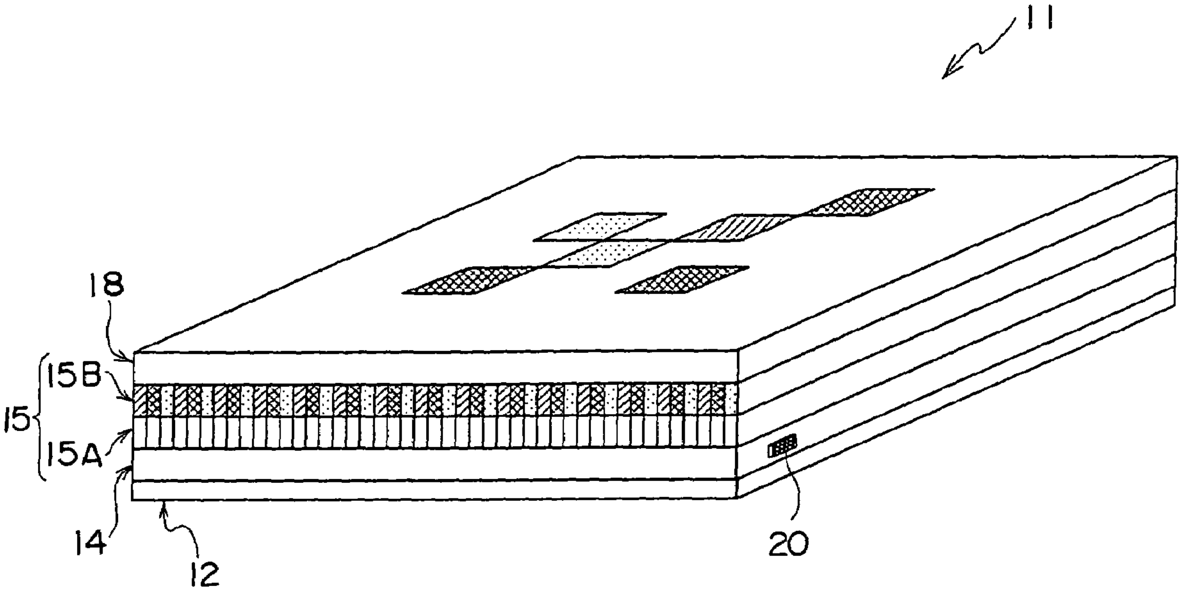
FIG. 9 is a plan view showing another embodiment that differs from the image display device according to the present invention shown in FIG. 1.

Specifically, as shown in FIG. 9, an image display device 11 has a light-emitting layer 15. The light-emitting layer 15 has a drive circuit 1 SA where luminescent elements that emit white-colored light are arranged in a matrix pattern, and a color filter layer 15B with luminescent elements of each R, G, and B colors are provided at positions corresponding that of the luminescent elements of the drive circuit 15A, and corresponding to each pixel of an image to be displayed. After the color filter layer 15B is layered, the display layer 18 including a photochromic compound supporting silver particles can be layered thereon. In this case, it is only necessary to further control the luminescent elements, which emit only white light, and are provided at the positions corresponding to each pixel of the inputted image, to emit light.

Here, cases which electrodes are not provided on the display layer 18 are described. However, a configuration such that transparent electrodes (ITO) is provided so as to face the upper layer and lower layer of the display layer 18 of the present embodiment, and voltage is applied between the upper and lower layers of the display layer 18 is also possible. Further, it can be configured such that voltage can be applied to only one of the upper layer or lower layer. In this case, the transparent electrode(s) can be made to connect to the sequencer 37 in order to be able to receive signals. The sequencer 37 may be designed to simultaneously apply voltage to the transparent electrode(s) provided at the display layer 18 when controlling each of the scan-side drive circuit 30 and the data-side drive circuit 28, so that image signal and scanning signal are supplied to each micro-pixel drive region 26 in accordance with image data inputted from an external device such as a PC via the data input unit 20.

An ITO provided at the lower layer can be made to function as a cathode electrode of the Dr-TFT 36. In this case, either of top-emission system or bottom-emission system can be employed.

Should the invention be configured in this manner such that voltage can be applied to the display layer 18 and voltage is applied to the display layer 18 when rewriting or erasing image data, the speed of color change on the display layer 18 including a photochromic compound can be increased as compared to when voltage is not applied. That is, the speed of image rewriting and erasure can be increased.

As described above, the image display device of the present invention can be configured to include a display layer formed with a photochromic compound; a light-emitting layer provided with multiple luminescent elements for irradiating visible light on the display layer; and a drive unit that drives the luminescent elements, in the light-emitting layer, corresponding to each pixel of an image according to image data so as to emit the color of visible light corresponding to each pixel of the image.

In the above-described image display device, multiple types of luminescent elements may provided in the light-emitting layer, with respect to each pixel of an image displayed on the display layer, and may irradiate visible light having different luminescence spectrum on corresponding pixel regions of the display layer. By this configuration, the drive unit can drive each of the luminescent elements of the light-emitting layer corresponding to each pixel of image data obtained with the obtaining unit, to irradiate visible light of colors according to each pixel of the image data. Accordingly, since luminescent elements that can emit visible light of each of the colors, say, red, blue and green are provided at each pixel, a full-color image according to the image data can be displayed at the display layer.

The multiple types of luminescent elements may be elements that emit light of a wavelength by which a full-color image can be formed on the display layer according to the photochromic compound. Due to this configuration, a full-color image according to image data can be displayed.

The above-described image display device can be configured to be portable. Due to this, a portable image display device with a simple configuration can be provided where an image displayed on a display layer formed by a photochromic compound can be rewritten.

Further, the above-described image display device can be designed to be further provided with a support substrate, on which the drive unit, the light-emitting layer, and the display layer are consecutively layered. With this configuration, an easily portable image display device can be provided where an image displayed on a display layer formed by a photochromic compound can be rewritten.

The flexing ability of the image display device as a whole can be improved by making this support substrate by flexible member or material.

Due to the above-described configuration, an image display device can be provided where an image corresponding to obtained image data that is easily displayed on a display layer is rewritable, despite having a simple configuration.

As described above, according to an aspect of the invention, an image display device includes: a display layer that comprises a photochromic compound and whose regions, which have been irradiated with visible light, can be optically rewritten in a color corresponding to the color of visible light irradiated thereon;

a light-emitting layer in which plural luminescent elements are arranged in a matrix pattern, the elements irradiating visible light to each differing region of the display layer by emitting light; and a drive unit provided with an obtaining unit that obtains image data, the drive unit driving, on the basis of image data obtained by the obtaining unit, each luminescent element corresponding to each pixel of an image according to the image data, to irradiate the visible light of a color corresponding to each pixel of the image.

Plural types of luminescent elements that each irradiate visible light having different luminescence spectrum on corresponding pixel regions of the display layer, may be provided in the light-emitting layer, with respect to each pixel of an image displayed on the display layer.

Plural types of luminescent elements emit light of a wavelength by which a full-color image may be formed on the display layer according to the photochromic compound.

The image display device may be portable.

The photochromic compound may comprise titanium oxide that supports silver particles.

Further comprising a support substrate on which the drive unit, the light-emitting layer, and the display layer may be sequentially layered.

The support substrate may comprise a flexible member.

The luminescent elements may be any one of organic electric field luminescent elements, inorganic electric field luminescent elements, or laser diodes.

The light-emitting layer may include luminescent elements that emit red, green, and blue light in each pixel region corresponding to each pixel of an image displayed on the display layer.

The drive unit may drive each luminescent element of the light-emitting layer such that the entire surface of the display layer turns white when image erasure command data is inputted to the obtaining unit.

The obtaining unit may comprise a data input unit that connects to an external device and obtains image data.

The light-emitting layer may comprise a white light-emitting layer in which luminescent elements that emit only white light are arranged in a matrix pattern, and a color filter layer in which luminescent elements that emit red, green, and blue light are arranged in a matrix pattern with respect to each pixel of an image displayed on the display layer, and the white light emitting layer and the color filter layer are layered in the light-emitting layer.

What is claimed is:

1. An image display device comprising:

a display layer that comprises a photochromic compound and whose regions, which have been irradiated with visible light, can be optically rewritten in a color corresponding to the color of visible light irradiated thereon;

a light-emitting layer in which a plurality of luminescent elements are arranged in a matrix pattern, the elements irradiating visible light to each differing region of the display layer by emitting light;

a drive unit provided with an obtaining unit that obtains image data, the drive unit driving, on the basis of image data obtained by the obtaining unit, each luminescent element corresponding to each pixel of an image according to the image data, to irradiate the visible light of a color corresponding to each pixel of the image; and a support substrate on which the drive unit, the light-emitting layer, and the display layer are sequentially layered.

2. The image display device of claim 1, wherein a plurality of types of luminescent elements that each irradiate visible light having different luminescence spectrum on corresponding pixel regions of the display layer, are provided in the light-emitting layer, with respect to each pixel of an image displayed on the display layer.

3. The image display device of claim 2, wherein the plurality of types of luminescent elements emit light of a wavelength by which a full-color image can be formed on the display layer according to the photochromic compound.

4. The image display device of claim 1, wherein the image display device is portable.

5. The image display device of claim 1, wherein the photochromic compound comprises titanium oxide that supports silver particles.

6. The image display device of claim 1, wherein the support substrate comprises a flexible member.

7. The image display device of claim 1, wherein the luminescent elements are any one of organic electric field luminescent elements, inorganic electric field luminescent elements, or laser diodes.

8. The image display device of claim 2, wherein the light-emitting layer includes luminescent elements that emit red, green, and blue light in each pixel region corresponding to each pixel of an image displayed on the display layer.

9. The image display device of claim 1, wherein the drive unit drives each luminescent element of the light-emitting layer such that the entire surface of the display layer turns white when image erasure command data is inputted to the obtaining unit.

10. The image display device of claim 1, wherein the obtaining unit comprises a data input unit that connects to an external device and obtains image data.

11. The image display device of claim 1, wherein the light-emitting layer comprises a white light-emitting layer in which luminescent elements that emit only white light are arranged in a matrix pattern, and a color filter layer in which luminescent elements that emit red, green, and blue light are arranged in a matrix pattern with respect to each pixel of an image displayed on the display layer, and the white light emitting layer and the color filter layer are layered in the light-emitting layer.

* * * * *